United States Patent [19]
Platt

[11] 3,807,525
[45] Apr. 30, 1974

[54] PHASE COMPENSATING CIRCUITRY FOR SEISMIC VIBRATOR INCLUDING A DUMMY VIBRATOR REFERENCE NETWORK

[75] Inventor: Harold S. Platt, Tulsa, Okla.

[73] Assignee: Seismograph Service Corporation, Tulsa, Okla.

[22] Filed: Nov. 6, 1972

[21] Appl. No.: 304,105

[52] U.S. Cl. .................................. 340/15.5 TC
[51] Int. Cl. .......................................... G01v 1/14
[58] Field of Search ............ 340/15.5 TC, 15.5 TD; 181/.5 H, .5 VM

[56] References Cited
UNITED STATES PATENTS

| | | | |
|---|---|---|---|
| 3,386,525 | 6/1969 | Vandram | 340/15.5 TC |
| 3,578,102 | 5/1971 | Ross | 340/15.5 TC |
| 3,713,040 | 1/1973 | Page | 340/15.5 TC |

OTHER PUBLICATIONS
Gevin, "Realization of an All–Pass Transfer Function Using Operational Amplifiers," Proceedings of the IEEE, October 1968, pp. 1746–1747.

*Primary Examiner*—Samuel Feinberg
*Assistant Examiner*—J. V. Doramus
*Attorney, Agent, or Firm*—Mason, Kolehmainen, Rathburn & Wyss

[57] ABSTRACT

A seismic vibrator is driven by a reference signal which is passed through an adjustable time delay or phase shift network. The time delay or phase shift introduced by the adjustable network is adjusted by phase correction means to keep the seismic vibrator output synchronized with the output of a "dummy vibrator" phase-shifting reference network that is also driven by the same reference signal. The phase-shift characteristic of the reference network is chosen to closely match the combined phase-shift characteristic of the seismic vibrator and the adjustable network.

10 Claims, 8 Drawing Figures

PHASE COMPENSATING CIRCUITRY FOR SEISMIC VIBRATOR INCLUDING A DUMMY VIBRATOR REFERENCE NETWORK

BACKGROUND OF THE INVENTION

The present invention relates to automatic phase control, and more particularly to an improved form of automatic phase adjustment for use in conjunction with the vibratory apparatus used in some forms of seismic surveying.

The classical way in which seismic surveying is carried out is by exploding dynamite to generate sound waves. The sound waves are transmitted into the earth and are reflected from geophysical formations below the earth's surface. The reflections or echos of the explosion sound waves return to earth after a time delay which is dependent upon how deep the corresponding geophysical formations lie beneath the earth's surface. The returning echos are typically sensed by sensitive microphone devices called "geophones," and the outputs of the geophones are amplified and are permanently recorded on paper.

Due to the expense of using dynamite in surveying, and due to the impossibility of carrying out seismic surveys using dynamite in built-up areas, an alternative technique for seismic surveying has come into widespread use. In the alternative technique, a "swept frequency" sinusoidal reference waveform is generated whose frequency slowly increases from about 20 Hz to about 80 Hz (Hz = cycles per second) over a brief period of time, typically about 15 seconds. This waveform is applied to the earth at one or more locations by one or more synchronized vibrators. The waveform is reflected by geophysical formations, just as the sound waves generated by a dynamite explosion are reflected, but the swept frequency waveform is so weak that the echos of the waveform which return to the earth's surface are almost entirely masked by noise. However, if the output of one or more geophones are recorded and are later cross-correlated against the swept frequency reference waveform which was transmitted into the earth, the result of the cross-correlation operation is a seismic survey record that is similar to the record which results from a dynamite survey and that reveals the nature of the geophysical formation underlying the earth below the synchronized vibrators. The cross-correlation process eliminates most of the noise from the survey record and also converts the swept frequency echos into impulse echos similar to the echos which result from dynamite surveys.

A major difficulty in carrying out vibratory seismic surveying is that of carefully controlling the vibrators so that the waveforms which they apply to the earth are properly synchronized with the swept frequency reference waveform and with one another. Typically, the swept frequency reference waveform is recorded on magnetic recording tape. Whenever a seismic survey is carried out, the tape containing the swept frequency reference waveform is played back, and the reference waveform is transmitted to each seismic vibrator over a radio communications link. Vibrator control circuitry then causes each vibrator to vibrate more-or-less in synchronism with the reference waveform.

Due to the non-ideality of the vibrators, each vibrator tends to introduce a time delay or phase shift (with respect to the swept frequency reference waveform) into the waveform which it applies to the earth. The length of this time delay or phase shift is dependent upon the nature of the earth beneath each vibrator and can vary significantly from one vibrator location to another. To prevent this time delay from having a detrimental effect upon a seismic survey, it is customary to insert adjustable time delay or phase shift networks between the control circuitry for each vibrator and the reference waveform radio receiver associated with each vibrator and to continuously adjust these adjustable networks so as to keep each vibrator locked in perfect synchronism with the incoming reference waveform. Typically, a sensing device called an accelerometer is used to sense the actual vibratory output of each vibrator. The phase of the signal generated by each accelerometer is compared to the phase of the incoming reference waveform, and analog multipliers are typically used to carry out this phase comparison. The output of each analog multiplier is fed to circuitry which adjusts the time or phase shift network associated with the corresponding vibrator so as to maintain phase synchronization between the vibrator and the swept frequency reference waveform. In this manner, each seismic vibrator is forced to vibrate synchronously with the reference waveform.

Numerous practical difficulties are encountered in implementing vibratory seismic surveys of this type in which the vibrators vibrate in synchronism with a reference waveform. In order to maintain phase synchronism, it is typically necessary to adjust each time delay or phase shift network so as to introduce a very large phase shift at low frequencies and so as to introduce a very small phase shift at higher frequencies. A large amount of phase correction capability is essential. As in any feedback control system where a device is forced to behave in a radically unnatural manner, instabilities may easily develop in the phase correction circuitry. "Hunting" may also be a problem. It is typically difficult to achieve good phase synchronization between vibrators at low frequencies even when the initial conditions of each vibrator are carefully adjusted before each survey. The adjustable time delay or phase shift networks typically add an additional time delay or phase error of their own to that of the seismic vibrator, and hence they aggravate the very problem which they are supposed to correct. In brief summary, a phase correction system of the type just described tends to be temperamental and has to be carefully adjusted each time it is placed into service. Seismic survey crews lose considerable time in the field adjusting conventional electrical networks of this type and checking out each vibrator for proper synchronism—time which could be much more usefully applied to the gathering of data and to the repositioning of vibrators and geophones.

SUMMARY OF THE INVENTION

A primary object of the present invention is to overcome the shortcomings of survey systems in which seismic vibrators are forced to operate in synchronism with a swept sinusoid reference signal. Additional objects of the invention are to provide control circuitry for a seismic vibrator which have a minimum number of adjustments and which typically require no adjustment when a vibrator is moved from one location to another. Other objects of the invention are apparent in the detailed description which follows.

In brief, the present invention contemplates providing a "dummy vibrator" phase shifting or time delay reference network. This reference network has phase shift or time delay characteristic which approximately corresponds to the time delay characteristic of a seismic vibrator. Preferably, the time delay or phase shift characteristic of this reference network is invariant and is describable by a simple mathematical expression.

As in prior art arrangements, the present invention contemplates connecting one or more adjustable time delay or phase shifting networks between a swept frequency reference waveform source and the control circuitry for one or more vibrators. However, the present invention does not contemplate controlling the adjustable networks to force each seismic vibrator to vibrate in synchronism with the swept frequency reference waveform as has been done previously. The present invention passes the swept sinusoid reference waveform through the "dummy vibrator" reference network and then controls the adjustable networks to achieve synchronization between the seismic vibrator and the signal which appears at the output of the "dummy vibrator" reference network.

Since the vibrator output would normally come close to following the output of the "dummy vibrator" reference network anyway, due to the similarity of the seismic vibrator's phase shift characteristic and that of the "dummy vibrator" reference network, the amount of phase correction which is imposed upon the vibrator by the present invention is quite small. As a result, the present invention may be constructed using a simple adjustable time delay or phase shifting network capable of generating less then 360° of phase shift maximum, and typically only a small portion of this maximum phase shift capability is actually utilized. In contrast, a conventional vibrator control system typically requires a much more complex adjustable time delay or phase shifting network capable of generating up to 1,000° of phase shift, and typically almost all of this phase shifting ability has to be utilized if synchronization is to be achieved.

To further simplify the present invention, the characteristics of the reference network may be chosen so as to automatically compensate for changes in the phase characteristics of the adjustable reference network with changes in frequency, thus further reducing the amount of control action which is required to maintain synchronization. The resulting seismic vibrator control circuitry may be far simpler and far more stable than prior arrangements. Simple presetting networks may be incorporated into the circuitry which networks are adjusted only when the nature of the swept frequency waveform is altered and which networks do not need to be adjusted when a set of vibrators are moved from one sweep location to another.

The signal which is transmitted into the earth is not the swept frequency reference waveform, as in prior art arrangements. Rather, the signal which reaches the earth is the output signal generated by the dummy vibrator reference network. The echos received by the geophones are cross-correlated with the output of the dummy vibrator reference network, rather than with the swept frequency waveform itself as is done in a conventional system. The result of the cross-correlation operation is a series of impulse echos, the same as in prior art arrangements wherein the vibrators are locked in synchronization with the swept frequency reference signal.

In the preferred embodiment of the invention, the characteristics of the reference network are defined by a simple mathematical relationship. Hence, a computer may be used to modify data representing the swept frequency reference waveform, and the modified waveform data may be used for cross-correlation. Hence, there is no need to record the output of the dummy vibraor reference network for use in the cross-correlation operation.

Other objects and advantages of the invention are apparent in the detailed description which follows, and the features of novelty which characterize the invention are pointed out with particularity in the claims annexed to and forming a part of this specification.

BRIEF DESCRIPTION OF THE DRAWINGS

For a further understanding of the invention, reference will be made to the drawings wherein.

DESCRIPTION OF THE PREFERRED EMBODIMENT

Figure 1:
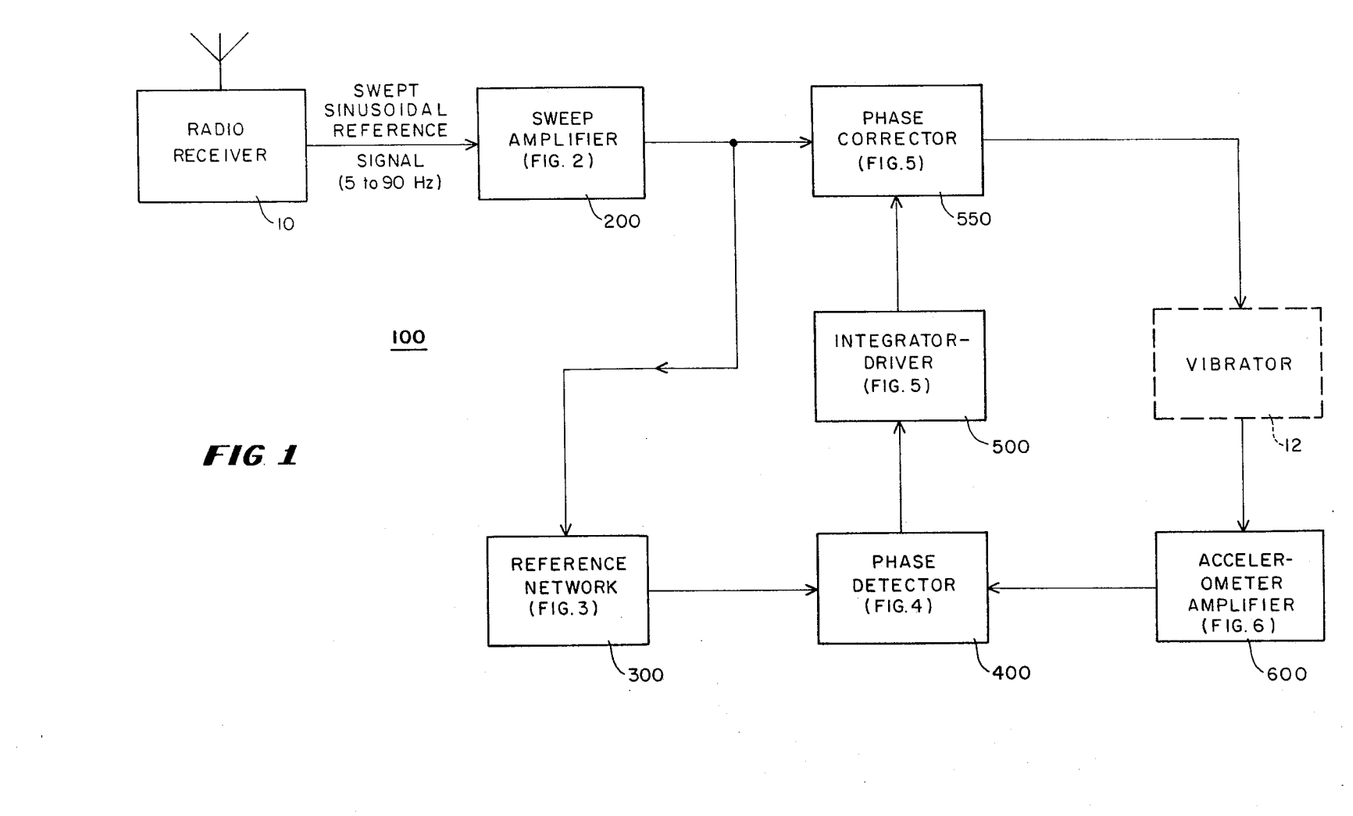
FIG. 1 is an overview block diagram of a vibrator control system designed in accordance with the present invention.

In FIG. 1, a system 100 is shown which accepts a reference waveform from a radio receiver 10 and which causes a seismic vibrator 12 to generate a signal suitable for seismic surveying. The system 100 is typically one of a number of vibrator control systems all of which are used simultaneously, but the system 100 is also suitable for use by itself. The reference waveform may be a swept sinusoid which may sweep from about 5 Hz (cycles per second) up to about 90 Hz in a period of about 15 seconds. Depending upon the nature of the survey, any one of a variety of different reference waveforms may be used, and the 5 Hz to 90 Hz reference waveform is selected as typical.

During an actual survey, the reference waveform is generated at a central location (not shown in the figures) and is transmitted over a radio communications link to all of the vibrator control systems which are in use (only one such system is illustrated in FIG. 1). With reference to FIG. 1, a radio receiver 10 within each control system receives the reference waveform and transmits the waveform to the seismic vibrator 12 through a sweep amplifier 200 and through an adjustable time delay or phase corrector 550. An accelerometer (not shown) senses the vibrations of the seismic vibrator 12 and generates a signal representing the actual vibrations of the seismic vibrator 12. This signal appears at the output of an accelerometer amplifier 600.

In accordance with the invention, a "dummy vibrator" reference network 300 is provided having a phase lag characteristic that is similar to the natural phase lag characteristic of the vibrator 12 and phase corrector 550. The reference waveform at the output of the sweep amplifier 200 is fed through the reference network 300. A multiplier or phase detector 400 compares the phase or synchronization of the signals presented by the reference network 300 and by the accelerometer amplifier 600. If a phase error exists and if synchronization is not proper, the detector 400 generates an error signal which is integrated by an integrator-driver 500 and which is applied to the phase corrector 550 as a phase adjustment signal. In this manner, the operation of the vibrator 12 is locked into synchronism with the reference network 300 output signal.

In the preferred embodiment of the invention, the phase shift characteristic of the reference network 300 is accurately represented by the simple equation:

$$\text{Phase shift} = A + B \log_{10} f$$

where "$A$" and "$B$" are arbitrary constants and where "$f$" is the frequency (in Hz) of the signal applied to the reference network 300. The reference network 300 is called a "dummy vibrator" because its phase shift characteristic resembles that of the seismic vibrator 12. The reference network 300 is preferably designed so that its output lags or has more phase shift than does the vibrator 12 at all frequencies of interest so as to take into account the additional phase shift introduced by the phase corrector 550.

Because the reference network 300 has phase characteristics similar to but lagging those of the seismic vibrator 12, the output of the seismic vibrator 12 naturally tends to stay in approximate phase synchronism with the output of the network 300 but tends to lead the output of the network 300 in phase. At the start of a survey, the integrator-driver 500 is adjusted to actuate the phase corrector 550 to cancel out this slight phase lead so that the vibrator 12 initially generates a sinusoid that is properly synchronized with the reference network output signal. As the vibration frequency increases during a survey, the output of the integrator-driver automatically shifts by just enough so as to maintain this synchronization. Since the reference network phase shift characteristics closely match the combined characteristics of the phase corrector and vibrator, the amount of phase correction which has to be carried out by the integrator-driver 500 is quite small. Whereas a conventional system generates a very large correction signal and forces a vibrator to vibrate unnaturally in precise phase synchronism with a reference signal, the present invention is set up so that the vibrator output is almost perfect without any compensation and needs only to be adjusted slightly in order to achieve precise synchronization with the output signal of the "dummy vibrator" reference network. As a result, the adjustment circuitry of the present invention is less critical than the corresponding circuitry used in conventional devices. Fewer adjustments are needed to achieve stable operation, and the possibilities for hunting or other forms of instability are greatly reduced.

Figure 3:
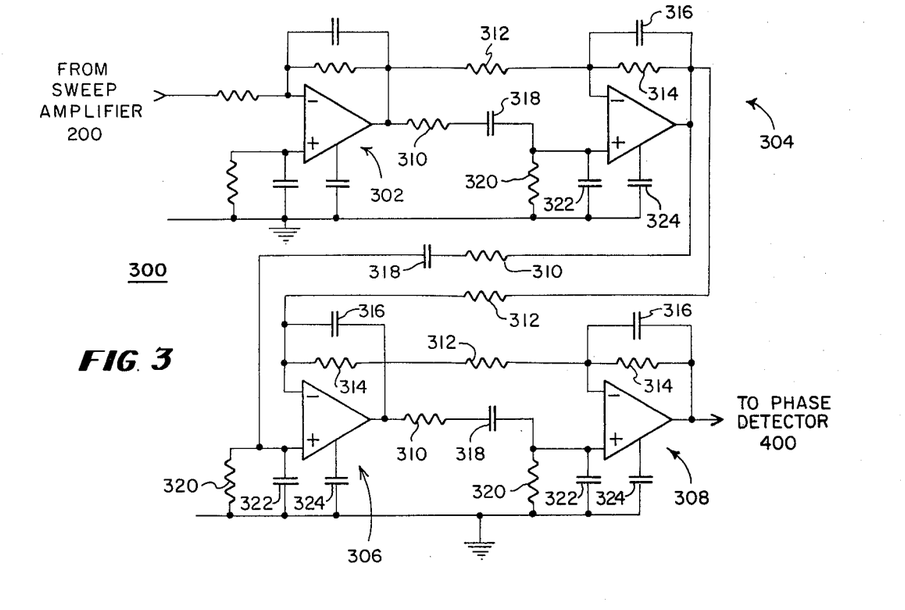
FIG. 3 is a schematic diagram of a dummy vibrator reference network which may be used in the system illustrated in FIG. 1 and which is designed to roughly duplicate the phase shift characteristic of a hydraulic vibrator.

FIG. 3 illustrates the details of the "dummy vibrator" reference network 300 which is used in constructing the present invention. It is to be understood that any suitably designed phase shift network may be used in constructing the network 300. Preferably, the frequency-versus-phase characteristic of the network comes close to matching the frequency-versus-phase characteristic of the vibrator 12 and phase corrector 550, as has been explained.

The following paragraphs present a more detailed, technical explanation of the precise role played by the reference network 300 in the invention.

The radio receiver 10 in FIG. 1 generates a "sinusoid" or "sinusoidal signal" during a seismic survey. A sinusoid is a smoothly oscillating signal which oscillates a certain number of times during each second. If a sinusoid oscillates 50 times in a second, it is said to have a "frequency" of "50 Hz" or "50 cycles per second." While the sinusoid generated by the receiver 10 "sweeps" from a low frequency to a high frequency over an extended time interval, at any moment the frequency of the sinusoid is relatively well defined.

The sinusoid generated by the receiver 10 takes a certain amount of time to flow through each of the elements 200, 550, 300, 12, and 600 shown in FIG. 1. Each of these elements is said to introduce a "time delay" into the path over which the sinusoid flows. If the time delay introduced by an element precisely equals the time it takes for a sinusoid to complete exactly one oscillation or cycle, then the sinusoid at the input and output of an element are said to be "in phase" with one another. Such an element, by definition, introduces a "phase shift" of 360° in the path of a sinusoid. If the time delay introduced by an element equals one-half the time it takes for a sinusoid to complete one cycle, then the element is said to introduce a "phase shift" of 180° in the path of the sinusoid. In a similar manner, any other time delay which an element introduces may be represented as a "phase shift" of so many degrees through the use of the following formula:

Phase shift (in degrres) = 360 × (element time delay)/(time for one cycle)

The "phase shift" introduced by one or more elements may also be measured directly using a device called a phase meter or using an oscilloscope. Two sinusoids of the same frequency which differ in phase by 180° are said to be "out of phase" with one another, since one will always be swinging up when the other is swinging down, and vice versa. Two sinusoids of the same frequency which differ in phase by 90° or 270° are said to be "in quadrature" with one another, since the time delay between the two sinusoids equals one-fourth the time it takes for either to complete a cycle.

Figure 7:
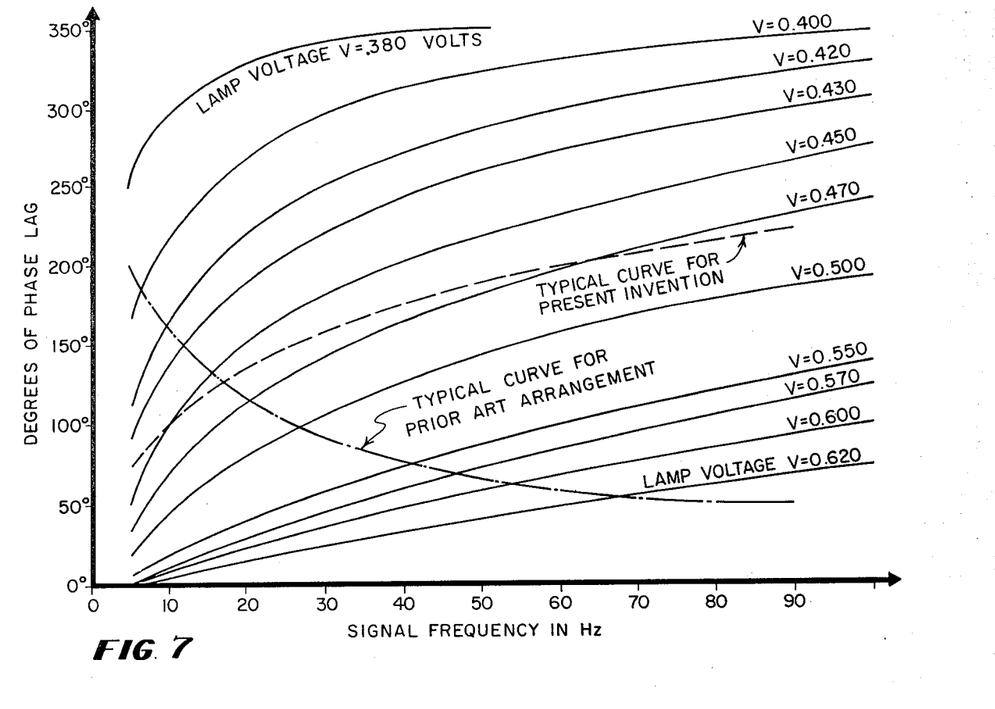
FIG. 7 is a plot of phase shift versus frequency for the adjustable phase shift network shown in FIG. 5 with separate curves labeled "$V=$" illustrating the network characteristics for a variety of adjustment voltage settings and with separately labeled curves illustrating typical adjustment settings required by the present invention and by a conventional control arrangement.
Figure 8:
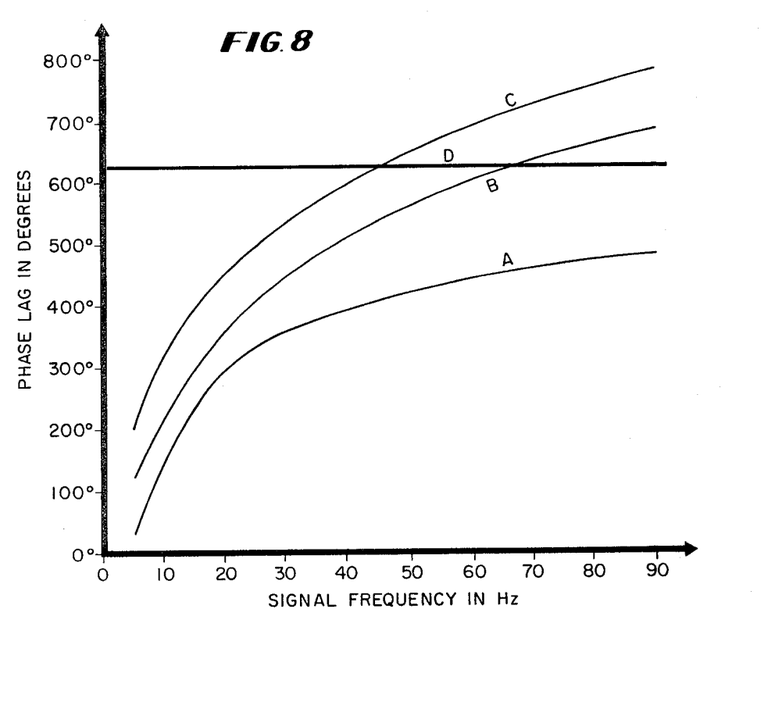
FIG. 8 is a plot of phase shift versus frequency illustrating the phase shift which occurs across a typical seismic vibrator (curve A) and across a "dummy vibrator" reference network (curve B); and also illustrating the phase difference between a swept sinusoid reference waveform and a seismic vibrator output signal for the present invention (curve C) and for a conventional control arrangement (curve D).

FIGS. 7 and 8 are both plots of phase shift versus frequency for various elements and various combinations of elements. FIG. 7 is a plot of the phase-shift-versus-frequency characteristics of the phase corrector 550. FIG. 7 illustrates how the phase shift characteristics of the element 550 vary with changes in a control voltage V generated by the integrator-driver 500. For example, if the voltage V equals 0.47 volts and if the receiver 10 is generating a sinusoid whose frequency is 40 Hz, then FIG. 7 indicates that the phase corrector 550 introduces a phase shift of 202° into the sinusoid. A phase meter connected to the input and output of the phase corrector 550 would thus indicate a phase shift of 202°. The corresponding time delay may be computed from the formula:

Time delay (in seconds) = phase shift/360 × (time for one cycle)

For a frequency of 40 Hz, the time for one cycle is one-fourtieth of a second. Using the above formula, the time delay introduced by the phase corrector 550 is (202/360) × (1/40) or about 0.014 seconds.

FIG. 8 is a plot of the phase-shift-versus-frequency characteristics of the seismic vibrator 12 (curve A), of the "dummy vibrator" reference network 300 (curve B), of the vibrator 12 and phase corrector 550 when used in implementing the present invertion (curve C), and of the vibrator 12 and a conventional phase corrector when used in implementing a conventional survey (curve D). For example, the curve C indicates that the phase shift introduced by the phase corrector 550 and seismic vibrator 12 into a 40 Hz sinusoid is 600° when the elements 550 and 12 are used for seismic surveying in accordance with the present invention. A phase meter connected between the input of the phase corrector 550 and the output of the accelerometer amplifier 600 would indicate a phase shift of only 240°, or 600° minus 360°, since a phase meter subtracts 360° from any phase shift greater than 360°. Throughout the discussion which follows, the output of the accelerometer amplifier 600 will be assumed to represent the velocity output of the vibrator 12 and will be used for all vibrator 12 output phase measurements.

With reference to FIG. 8, the phase shift which is produced by the hydraulic vibrator 12 used in implementing the preferred embodiment of the invention is indicated by the curve A. To a very rough first approximation, this curve may be represented by the equation:

Phase shift = $A + B \log_{10} f$ where $f$ is the frequency of the sinusoid which is being transmitted to the earth, and where $A$ and $B$ are constants chosen to match this equation to the curve A in FIG. 8.

In accordance with the invention, it is desired to provide a "dummy vibrator" reference network whose phase-shift characteristics are similar to those of the vibrator 12. In the preferred embodiment of the invention, a network which obeys the above general equation was selected. It is to be understood that many networks are available whose characteristics may be described by the above equation. The particular network which was selected for use in the preferred embodiment of the invention is one which is due to R. Genin and which is described in a letter entitled "Realization Of An All-Pass Transfer Function Using Operational Amplifiers" published in the PROCEEDINGS OF THE IEEE, Oct., 1968, on pages 1746 and 1747. Genin's network may be implemented using a single operational amplifier and does not require transformers or other expensive, bulky devices.

The "dummy vibrator" reference network is shown schematically in FIG. 3. Input sinusoids to the dummy vibrator are applied to an input amplifier 302 having a gain of 5. The input amplifier 302 is followed by three identical, unity-gain phase shifting amplifiers 304, 306, and 308 each of which is designed in accordance with the teachings of Genin. By way of example and not by way of limitation, the following component values are used in the construction of the identical phase shifting amplifiers 304, 306, 308:

| Reference No. | Component | Value |
|---|---|---|
| 310 | Resistor | 15,000 ohms |
| 312 | Resistor | 100,000 ohms |
| 314 | Resistor | 20,000 ohms |
| 316 | Capacitor | 430 micromicrofarads |
| 318 | Capacitor | 0.22 microfarads |
| 320 | Resistor | 15,000 ohms |
| 322 | Capacitor | 0.22 microfarads |
| 324 | Capacitor | 51 micromicrofarads (as needed to compensate operational amplifier) |

Any suitable high-gain operational amplifiers may be used in constructing the circuit shown in FIG. 3.

In FIG. 8, the curve B represents the phase-shift characteristics of the circuit illustrated in FIG. 3. The similarity between the characteristics of the circuit shown in FIG. 3 as represented by the curve B and the characteristics of the vibrator 12 as represented by the curve A are apparent in the figure. The curve B is intentionally made to lag the curve A by an increasing amount at higher frequencies so as to compensate for the increasing amount of phase shift that is introduced by the phase corrector 550 at higher frequencies (see FIG. 7 for a plot of the phase-shift characteristics of the phase corrector 550). In actual operation, the phase detector 400 (FIG. 1) maintains a 90° "quadrature" relationship between the vibrator 12 velocity output and the signal output of the reference network 300. The curve C in FIG. 8 represents the amount by which the velocity output of the vibrator 12 lags the swept sinusoid reference waveform which appears at the output of the sweep amplifier 200 in FIG. 1. The curves B and C are separated from one another by 90°. Hence, the seismic vibrator velocity output is kept in quadrature (90° phase shift) with the output of the "dummy vibrator" reference network.

For purposes of comparison, FIG. 8 also includes a curve D which represents the amount by which the velocity output of a conventional vibrator lags the corresponding swept sinusoid reference waveform, operating without the use of a "dummy vibrator" reference network and in accordance with the teachings of the prior art. The curve D illustrates that in a prior art system the phase lag between the swept sinusoid reference waveform and the vibrator velocity output is held constant and is not allowed to vary with frequency. It will be rememebered that the curve A represents the natural phase-shift characteristic of a seismic vibrator without compensation. A comparison of the curves A and D reveals that in a conventional system the phase corrector has to develop a phase shift of over 600° at a frequency of 5 Hz and a phase shift of only 150° at a frequency of 90 Hz. In addition, the conventional phase corrector must overcome its own natural tendency to generate increasing amounts of phase shift with increasing frequency. Typically, a phase corrector of this type has to be constructed from six or more 180° adjustable phase shift networks connected in cascade one after another. Any lesser number of networks does not necessarily give enough phase shift to allow the curve D in FIG. 8 to be achieved.

In contrast to the prior art arrangement just described, a phase corrector used in constructing the present invention needs to insert only enough phase shift between the reference signal and the vibrator so as to shift the curve A up to the curve C. At 5 cycles per second, a phase shift of approximately 175° is required, and at 90 cycles per second a phase shift of approximately 300° is required. An adjustable phase shift network which includes two stages each capable of generating a 180° phase shift is more than adequate. In addition to reducing the complexity of the phase corrector, the present invention also utilizes the inherent tendency of any phase corrector to generate larger phase shifts at higher frequencies in such a manner as to aid in the achievement of phase synchronization with less control effort. In a conventional system, the adjustment signal which is fed into the phase corrector has to buck the natural tendency of the phase corrector to generate larger phase shifts at higher frequencies. The present invention actually requires only about one twenty-fifth the amount of control action required by a conventional system, as is demonstrated below in the discussion which accompanies FIG. 7.

Figure 2:
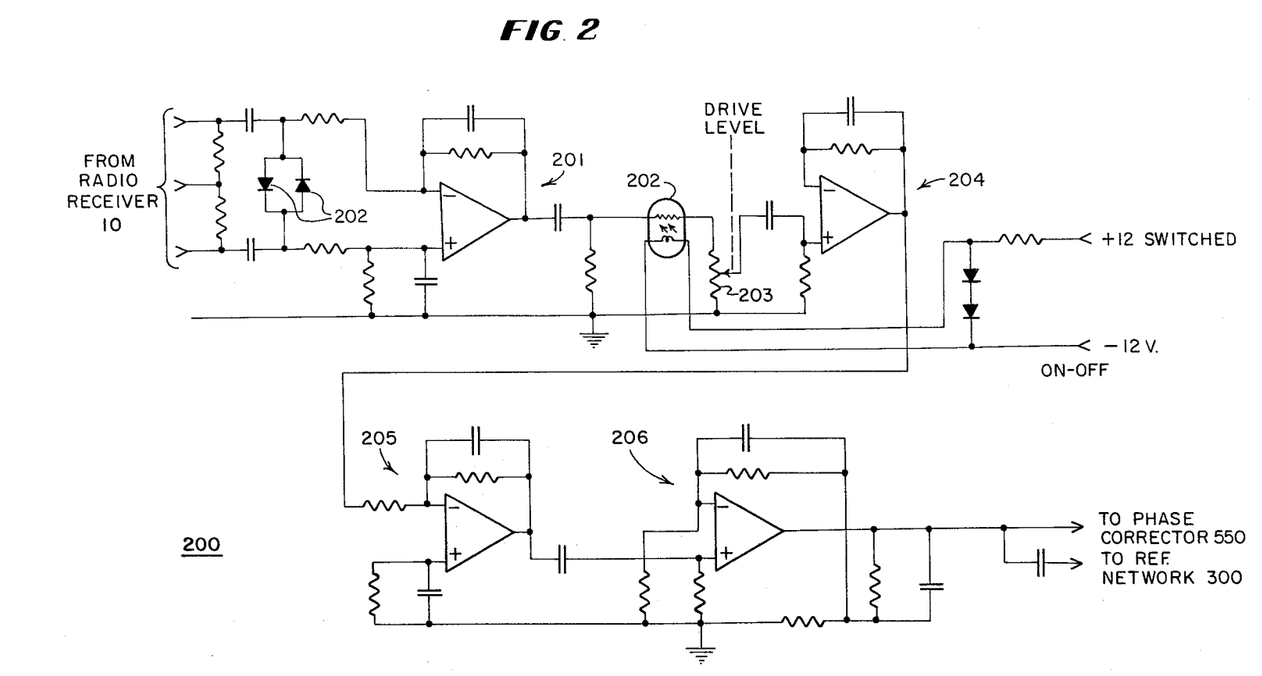
FIG. 2 is a schematic diagram of a sweep signal amplifier which may be used in constructing the system shown in FIG. 1.

FIG. 2 illustrates the circuit details of the sweep amplifier 200 which is shown in FIG. 1 used to amplify the output of the radio receiver 10. In addition to amplifying the reference signal, the sweep amplifier 200 is designed to compensate for phase shift errors introduced into the reference signal during the radio transmission process.

Briefly described, the amplifier 200 includes a differential input amplifier stage 201 into which the output of the radio is applied. Diodes 202 prevent the radio output from overloading the input to the amplifier 201. The output of the amplifier 201 is applied through a lamp and photo resistor assembly 202 which serves as an "ON-OFF" switch for the swept sinusoid reference waveform. Any signal which passes the assembly 202 is applied to a gain control adjustment 203, and the output of the gain control adjustment 203 is applied to a unity gain buffer amplifier 204. The output signal developed by the amplifier 204 is applied to an integrator 205 whose characteristics are intended to eliminate a 90° phase shift and a 6 decibel-per-octave gain error in the signal which is supplied by the radio. The integrated output of the amplifier 205 is applied to a unity-gain buffer amplifier 206. The output of the buffer amplifier 206 is passed on to the "dummy vibrator" reference network 300 which is shown in FIG. 3 and also to the phase corrector 550 which appears in FIG. 5.

The amplifiers used in constructing the sweep amplifier 200 are conventional operational amplifiers, and any suitable type of operational amplifier may be used in the construction of the sweep amplifier 200. The lamp and photo resistor assembly 202 is a "Raysistor" (registered trademark) assembly, model CK1114, which may be purchased from the Raytheon Company.

FIG. 3 is a schematic diagram of the "dummy vibrator" reference network and has already been fully described.

Figure 4:
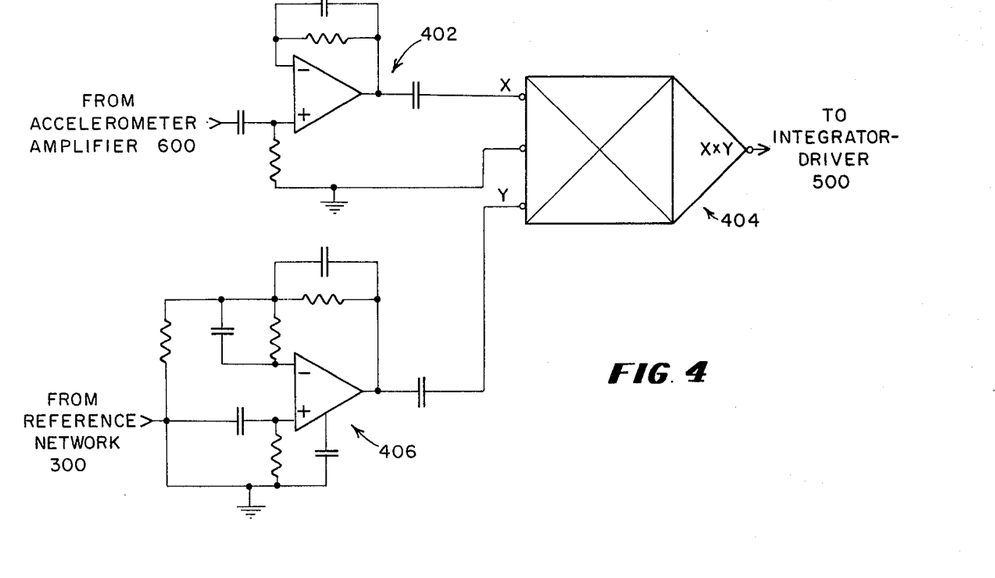
FIG. 4 is a schematic diagram of a phase detector or multiplier circuit suitable for use in constructing the system shown in FIG. 1.

FIG. 4 is a schematic diagram of the phase detector 400 which is used in FIG. 1 to generate an error signal representing the phase difference between the output signals of the "dummy vibrator" reference network 300 and of the accelerometer amplifier 600. More particularly, the phase detector 400 generates an output signal whose amplitude is proportional to the analog product of two incoming sinusoids. The output of the phase detector 400 includes two components—a high frequency component which does not serve any useful purpose, and a low frequency component which indicates the phase relationship of the two incoming sinusoids. If the sinusoids are in quadrature (90° out-of-phase) with one another, then the low frequency output of the phase detector 400 is zero. Over a limited phase range of, perhaps, 30 or 40° to either side of this quadrature zero point, the low frequency output of the phase detector 400 is proportional to the number of degrees by which the incoming sinusoids differ from a 90 or 270° phase relationship with one another. For example, the following table illustrates possible low frequency outputs which might be generated by the phase detector 400 in response to different phase displacements of the phase detector input signals:

| Input Signal Phase Difference | Phase Detector Output |
|---|---|
| 80 degrees | −2Y |
| 85 degrees | −Y |
| 90 degrees | 0 |
| 95 degrees | Y |
| 100 degrees | 2Y | where Y is an arbitrary constant which is dependent upon the gain of the phase detector 400. For phase errors greater than about 30°, the relationship between the phase error and the detector 400 low frequency output does not remain linear but becomes a simple cosine waveform relationship, since the phase detector direct current output signal is actually proportional to the cosine of the phase difference between the two incoming signals.

With reference to FIG. 4, the sinusoid which is generated by the accelerometer amplifier is fed into a unity-gain buffer amplifier 402. The output of the amplifier 402 is fed into a first $X$ input of a transconductance multiplier device 404. The swept sinusoid reference waveform from the sweep amplifier 200 is passed through a unity-gain buffer amplifier 406 and is applied to a $Y$ input of the transconductance multiplier device 404. The analog product of the $X$ and the $Y$ inputs of the transconductance multiplier device 404 appears as an output "$X \times Y$" ($X$ times $Y$) signal and is applied to the integrator-driver 500 shown in FIG. 5.

The transconductance multiplier 404 is an analog multiplier/divider, model 107C, which may be purchased from Hybrid Systems Corporation. Other companies manufacture similar transconductance multipliers which may also be used in constructing the invention. Prior art arrangements typically use a Hall-effect multiplying device. The present applicant has found that a better low-frequency response vibrator control characteristic may be achieved by using a transconductance multiplier in place of the traditionally used Hall-effect device. However, it is possible to construct a workable embodiment of the present invention using a Hall-effect multiplier. It is also possible to construct workable embodiments of the present invention which use entirely different types of phase error detection circuits from the two just discussed. It is not essential to operation of the present invention that the phase detection circuit generate a zero output when the input signals are 90° out of phase with one another, and a phase detection circuit which generates a zero output when the signals are in phase, 180° out of phase, or at some other fixed arbitrary phase relationship with respect to one another would be entirely satisfactory, FIG. 5 contains schematic diagrams of the integrator-driver 500 and of the phase corrector 550. Considering first the phase corrector 550, it is a conventional, two-stage, adjustable phase shift circuit in which each stage is capable of delivering a maximum 180° phase shift. As in most such circuits, a phase shift without attenuation and without the use of transformers is achieved within each stage by providing both inverted and non-inverted sources of the stage input signal and by interconnecting the inverted and non-inverted sources with a simple series circuit containing a variable resistor and a capacitor. The stage output is then derived from a node which is common to both the resistor and the capacitor through a unity-gain buffer amplifier. The ohmic value of the resistor is adjusted to vary the phase-shift within such a stage. The resistor is a photo-resistor mounted adjacent a controllable lamp or other source of illumination within a light tight enclosure. The particular photo resistor-lamp assemblies used in the preferred embodiment of the present invention are called Raysistors (trademark) model No. CK1114 which may be purchased from the Ratheon Company. Any suitable equivalent variable resistor type device may also be used. It is also possible to control the phase shift introduced in each stage by varying the stage capacitor.

Figure 5:
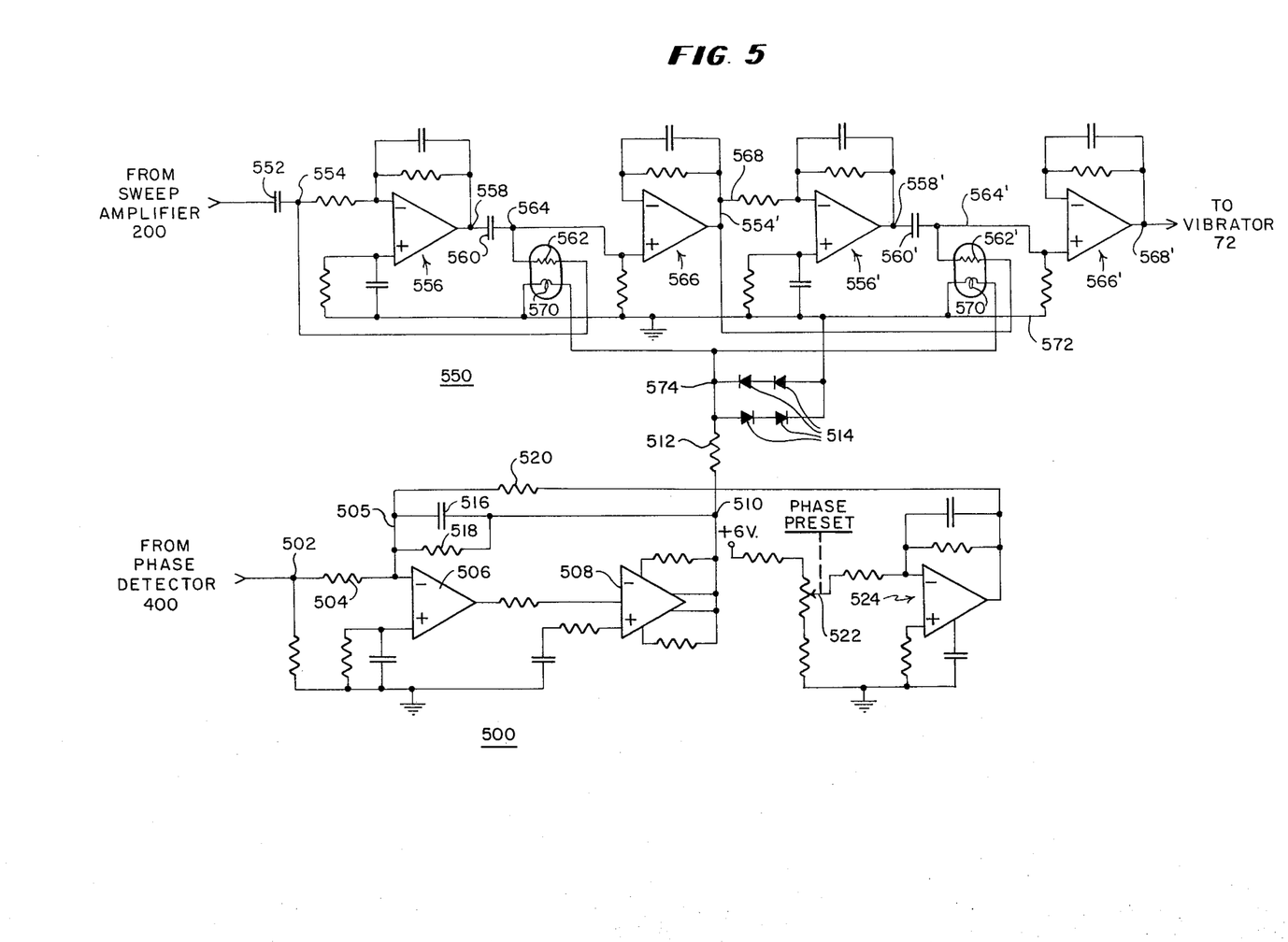
FIG. 5 is a schematic diagram of a combined integrator and adjustable phase shift network that is suitable for use in constructing the system shown in FIG. 1 and that provides an adjustable phase shift of up to 360°.

The output signal from the sweep amplifier 200 is applied through a capacitor 552 to an input node 554 of the first phase shift stage within the phase corrector 550. THe input node 554 serves as a source of non-inverted input signal for the first stage. An inverting amplifier 556 accepts as an input the non-inverted signal at the node 554 and generates an inverted signal at a node 558. A capacitor 560 and a photoresistor 562 are connected in series between the node 554 at which the non-inverted input signal appears and the node 558 at which the inverted input signal appears. A node 564 which is common to both the capacitor 560 and the photoresistor 562 is connected to the input of a unity-gain buffer amplifier 566, and the output 568 of the buffer amplifier 566 represents the output of the first stage of the phase corrector 550.

The second stage of the phase corrector 550 is identical to the first stage and is connected between the output of the first stage and the output of the phase corrector 550. The elements which comprise the second stage of the phase corrector are numbered with the same reference numbers as the elements of the first stage but with primes so as to distinguish the second stage elements from those of the first stage.

A pair of lamps 570 are mounted adjacent the photoresistors 562 and 562' and are electrically connected together in parallel between a ground potential node 572 and a node 574. A voltage applied between the node 574 and the ground potential node 572 causes the lamps 570 to be illuminated. In response to illumination of the lamps 570, the photoresistors 562 and 562' respond by lowering their ohmic values. Since the ohmic values of the photoresistors 562 and 562' determine the amount of phase shift which is applied to a signal which passes through the phase corrector 550, the potential at the node 574 may be varied to control the amount of phase shift that is introduced into a signal by the phase corrector 550.

FIG. 7 is a graphical representation of the operating characteristics of the phase corrector 550 used in constructing the preferred embodiment of the invention. The horizontal axis of the graph corresponds to signal frequency in Hz (cycles per second) and the vertical axis of the graph represents the amount of phase shift which is introduced into a signal by the phase corrector 550. Each of the graph curves is labeled with a voltage and corresponds to a particular phase adjustment voltage applied between the node 574 in FIG. 5 and the ground node 572. It is evident from FIG. 7 that for any given phase adjustment voltage, the phase shift introduced by the phase corrector 550 increases significantly with an increase in the frequency of the corrector input signal frequency.

The particular phase adjustment voltage which is applied to the corrector 550 during a typical operation of the present invention is plotted as a broken line in FIG. 7 labeled "TYPICAL CURVE FOR PRESENT INVENTION." It is assumed that a swept frequency waveform is transmitted to the earth which varies in frequency from 5 to 90 Hz, and it is further assumed that the system is operating along the curve C shown in FIG. 8 using a seismic vibrator whose characteristics are represented by the curve A in FIG. 8.

When the initial 5 cycles per second waveform is first generated, FIG. 7 indicates that the phase adjustment voltage is approximately 0.445 volts. As the waveform gradually sweeps upwards to 90 Hz., the lamp voltage graudally increases until the lamp voltage equals approximately 0.475 volts at the end of the sweep interval. The phase adjustement voltage thus varies by about 0.03 volts during the survey operation, or by roughly 6 percent of the phase adjust voltage magnitude. It is noteworthy that the broken curve shown in FIG. 7 is almost parallel to the solid curves in FIG. 9 which correspond to constant lamp voltages. This parallel positioning of the curves illustrates that very little control action is required to achieve full synchronization.

To illustrate further how the present invention differs from prior art arrangements, let it be assumed that three phase correctors identical to the phase corrector 550 are connected in cascade so as to form a phase corrector which might be suitable for use in a conventional system. Let it be further assumed that a single adjustment voltage is supplied simultaneously to all three phase correctors. The resultant phase corrector would generate three times the amount of phase correction that the phase corrector 550 shown in FIG. 5 generates. Let it then be assumed that the resulting phase corrector is used to force a vibrator whose characteristics are represented by the curve A in FIG. 8 to operate in accordance with the curve D shown in FIG. 8, as in a conventional system. The resultant phase adjustment voltage curve is plotted in FIG. 7 and is the hatched curve labeled "TYPICAL CURVE FOR PRIOR ART ARRANGEMENT." In order to achieve the desired phase relationship, an initial lamp voltage of approximately 0.395 volts is required to give a 600° (200° times 3) phase shift for an initial 5 Hz waveform. As the waveform sweeps up to 90 Hz., the phase adjust voltage is increased to a final value of approximately 0.635 volts. The resultant voltage change is thus 0.24 volts, or about 50 percent of the phase adjust voltage magnitude. The conventional arrangement requires a phase adjust voltage swing that is about 8 times greater than that required by the present invention to achieve synchronization. It is apparent in FIG. 7 from the way that the hatched curve runs contra to the direction of the constant phase adjustment voltage curves that the conventional arrangement is bucking the natural tendency of the phase corrector 550 to grant an increasing amount of phase shift with increasing frequencies. Since the conventional arrangement requires eight times more phase adjust voltage shift and three times the number of phase corrector stages, the above example indicates that the amount of control action carried out by a conventional arrangement is about 24 times the amount carried out by the present invention. Many advantages of the invention flow directly from this reduction in the amount of control action which is required.

The integrator-driver 500 appears in the lower half of FIG. 5. The integrator-driver 500 accepts as an input the output of the phase detector 400 and generates the phase adjust voltage which is applied to the node 574 of the phase corrector 550.

The output of the phase detector 400 is applied to an input node 502 of the integrator-driver 500. The node 502 is connected by a resistor 504 to an inverted input of an operational amplifier 506. The output of the operational amplifier 506 is connected to a booster amplifier 508 which generates an output having sufficient drive to operate the lamps 570 within the phase corrector 550. The two amplifiers 506 and 508 thus function together as a single operational amplifier having a high gain and also having the ability to supply a considerable amount of current to an output node 510. The output node 510 is connected by a 100 ohm resistor 512 to the node 574 which connects to the lamps 570 of the phase corrector 550. Hence, any output signal which is developed at the node 510 is supplied directly to the lamps 570. To prevent an excessively high output from damaging the lamps 570, diodes 514 are connected in pairs back-to-back between the node 574 and ground.

While the circuit 500 is called an integrator-driver, it is, in fact, not a true integrator. A 1,000,000 ohm feedback resistor 518 couples the output signal at the node 510 back to the inverted input of the amplifier 506. Input resistors 504 and 520 which couple signals into the amplifier 506 are also 1,000,000 ohm resistors. Hence, with respect to a long-term, direct current signal component applied to the integrator-driver, the amplifier stages 506 and 508 combine to act as a unity-gain inverting amplifier which generates a D.C. output signal at the node 510 equal to but opposite in sign to any direct current voltage applied to the amplifier input. A true integrator is incapable of generating a stable output in response to a stable input, but generates an output which ramps in an upwards or a downwards direction in response to any input signal other than zero.

A 1 microfarad capacitor 516 also connects the output node 510 to the inverted input of the amplifier stage 506 and greatly decreases the gain of the amplifier stages 506 and 508 for high frequency alternating current signal components. It was previously mentioned that a high frequency component appears at the output of the phase detector 400. This high frequency component is applied to the node 502 but does not appear at the output node 510 due to the capacitor 516 causing the integrator-driver to function as a low-pass filter. The capacitor 516 also tends to integrate the low frequency component supplied by the phase detector 400 to the node 502.

It is desirable to preset the voltage at the node 574 before the onset of each seismic survey operation so that when a sweep operation is first commenced the phase corrector starts up the vibrator in phase with the output of the reference network 300 and so that an initial period of hunting on the part of the phase corrector and integrator-driver is avoided. In prior art devices, a true integrator was often used to couple the output of a phase detector to the input of a phase corrector, and it was typically necessary to somehow establish an initial charge upon a capacitor within the integrating circuit at the moment when each sweep operation commenced. Since the integrator-driver 500 is actually an amplifier and not a true integrator, an initial voltage at the node 574 is easily established by simply applying a constant level direct current input to the inverting input of the amplifier 506. An adjustable phase preset voltage is generated by a potentiometer 522 which is connected between a positive source of potential and ground. The positive phase preset voltage appears at the slider of the potentiometer 522, is inverted by a unity-gain inverting amplifier 524 and is applied through the resistor 520 to the inverting input node 505 of the amplifier 506.

With reference to FIG. 1, during the periods when radio receiver 10 is not generating a sweep signal output or when the sweep amplifier 200 is turned off, no input is supplied to the reference network 300 and the reference network applies essentially a zero level output signal to the phase detector 400. The output of the phase detector 400 is then also close to zero level, an essentially zero volts are applied to the input 502 of the integrator-driver 500. The only significant D.C. input of the integrator-driver 500 comes from the output of the amplifier 524 through the resistor 520.

As mentioned previously, the capacitor 516 has no effect upon D.C. signals, so the resistors 518 and 520 together cause the two amplifiers 506 and 508 to behave as a simple unity-gain inverting amplifier with respect to the phase preset signal. As a result, a D.C. potential appears at the node 510 which is approximately equal to the potential at the slider of the potentiometer 522. This potential is passed through the resistor 512 and becomes the initial value of the phase adjust voltage for the phase corrector 550. It is thus a simple matter to adjust the phase preset potentiometer 522 to give any desired amount of initial phase compensation before the onset of a sweep interval. Once again, the reason why this simple method for presetting the initial phase compensation is possible is that the two amplifiers 506 and 508 function together as an amplifier for direct current signals and do not behave as a true integrator. If the output of the amplifier 524 were fed to the input of a true integrator through the resistor 520, the output of the integrator would climb at a steady rate until the integrator output saturated. It is impossible to preset a true integrator output in the manner shown in FIG. 5.

Figure 6:
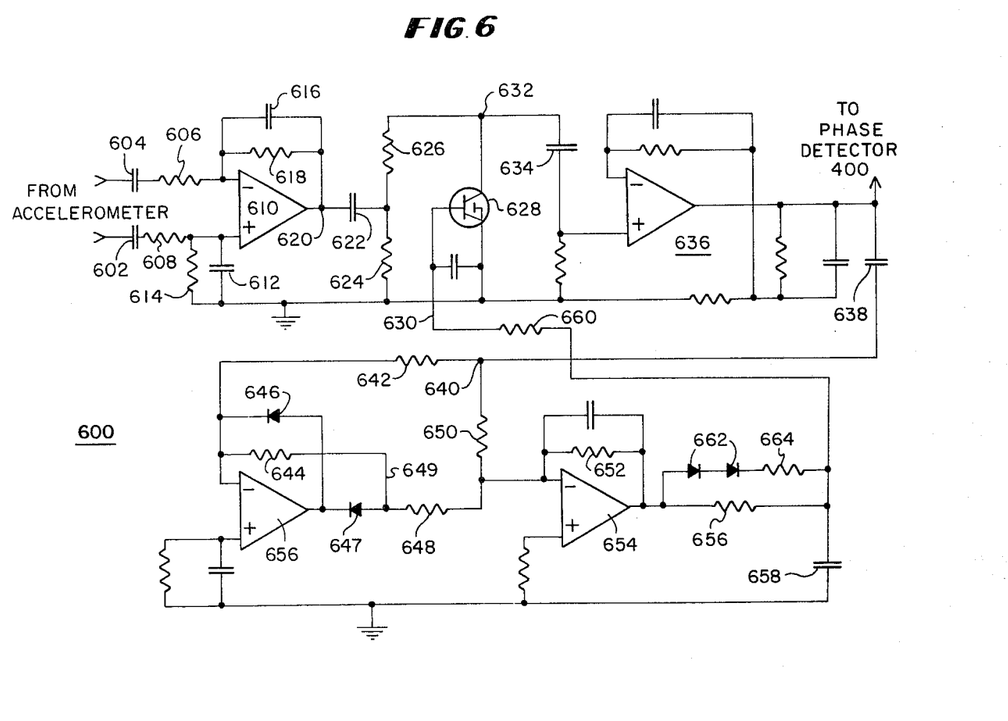
FIG. 6 is a schematic diagram of an accelerometer signal amplifier including provision for automatic gain control which may be used in constructing the system shown in FIG. 1.

FIG. 6 is a schematic diagram of the accelerometer amplifier 600. Briefly stated, the amplifier 600 first integrates the accelerometer output signal to give a signal representing the velocity of the vibrator baseplate. The amplifier 600 then automatically varies the amplitude of the resultant integrated signal so as to present a relatively stable output signal to the phase detector 400. An accelerometer (not shown) is connected by a pair of 10 microfarad capacitors 602 and 604 and 47,000 ohm resistors 606 and 608 to the non-inverting and inverting inputs of an operational amplifier 610. The non-inverting input of the amplifier 610 is connected to ground by a parallel circuit comprising a 2.2 million ohm resistor 614 and a 0.1 microfarad capacitor 612. The inverting input of the amplifier 610 is connected to the amplifier 610 output by a parallel circuit comprising a 0.1 microfarad capacitor 616 and a 2.2 million ohm resistor 618. The purpose of the resistors 614 and 618 is simply to bias both the inputs and the output of the amplifier 610 at about ground potential.

In response to a positive potential appearing across the accelerometer, the amplifier 610 forces a current to flow over the following current path: from ground, through the capacitor 612, through the resistor 608, through the capacitor 602, through the accelerometer, through the capacitor 604, through the resistor 606, and through the capacitor 616 and into the amplifier 610 output terminal 620. Since the capacitors 602 and 604 are 100 times larger than the capacitors 612 and 616, this current flow causes only a negligible change in the charge on the capacitor 602 and 604 but charges both the capacitors 612 and 616 by equal amounts in accordance with the magnitude and time duration of the accelerometer voltage. The amplifier 610 generates an output potential at 620 which, in essence, is the sum of the potentials developed across the capacitor 612 and 616 and which therefore represents the integral of the potential across the accelerometer. In response to a negative potential across the accelerometer, current flows over the same path in the opposite direction and the potential at the node 620 moves in the opposite direction. Common-mode signals applied by the accelerometer to both inputs of the amplifier 610 tend to charge both the capacitor 612 and 616 in such a manner as to produce little or no net change in the signal level at the output 620 of the amplifier 610, and hence the input configuration shown not only integrates but also tends to reject common node signals from the accelerometer input terminals.

A capacitor 622 whose value is 10 microfarads applies the output signal of the amplifier 610 to a 1 million ohm resistor 624. The potential across the resistor 624 is then applied to a series circuit comprising a 100,000 ohm resistor 626 and a field effect transistor 628 whose resistance may be varied by adjustment of the potential upon a line 630 which connects to the field effect transistor gate. The resistor 626 and the field effect transistor 628 act as a voltage divider circuit which jointly act to produce at a node 632 (common to the elements 626 and 628) a voltage whose magnitude may be varied by means of a control signal applied to the line 630. The voltage at the node 632 is coupled by a 10 microfarad capacitor 634 to the input of an amplifier 636 which is adjusted to have a gain of approximately 200. The output of the amplifier 636 is the output of the accelerometer amplifier 600 and is fed to the phase detector 400, as is illustrated in FIG. 1.

The circuitry shown in the lower half of FIG. 6 is an automatic gain control circuit which senses the signal level at the output of the amplifier 600 and which generates a varying potential which is applied to line 630 so as to maintain a relatively constant signal level at the output of the amplifier 600.

The output of the amplifier 636 is coupled by a 10 microfarad capacitor 638 back to a node 640. The node 640 is the input to the automatic gain control circuitry. The potential at the node 640 is applied by a resistor 650 to an inverting input of an operational amplifier 654. A resistor 652 interconnects the input and output of the amplifier 654. The resistors 650 and 652 are both 100,000 ohm resistors, and as a result, a signal component appears at the output of the amplifier 654 which is equal in magnitude but opposite in sign to the signal at the node 640. When the node 640 is negative with respect to ground, no other signal component but this one is present at the output of the amplifier 654.

The potential at the node 640 is also applied to the inverting input of an operational amplifier 656 through a resistor 642. When the node 640 is positive with respect to ground, a diode 646 connected between the output and the input of the amplifier 656 is back biased, and a diode 647 at the output of the amplifier 656 is forward biased. A resistor 644 is effectively connected between the amplifier 656 input and output. The resistors 642 and 644 are both 100,000 ohm resistors, and hence a voltage is developed at a node 649 which is equal in magnitude but opposite in sign to the voltage at the node 640. A 51,000 ohm resistor 648 connects the node 649 to the inverted input of the amplifier 654. Since the resistor 648 is 51,000 ohms and the resistor 652 is 100,000 ohms, a signal component appears at the output of the amplifier 654 which is equal to twice the magnitude of the signal which appears at the node 640 and which has the same sign as the signal which appears at the node 640. One half of this signal component cancels out the signal component discussed in the last paragraph, and the other half of this signal component, which is equal to and has the same sign as the signal at the node 640, is present at the output of the amplifier 654 when the node 640 is positive.

When the node 640 is positive with respect to ground, the output of the amplifier 654 also goes positive with respect to ground by the same amount. When the node 640 goes negative with respect to ground, the output of the amplifier 654 goes positive by the amount which the node 640 goes negative. Hence, the net effect of the circuitry just described is full wave rectification of the signal at the node 640. The rectified signal appears at the output of the amplifier 654.

The D.C. component of the rectified signal is isolated by a low pass filter comprising a 33,000 ohm resistor 656 and a 10 microfarad capacitor 658. The D.C. potential developed across the capacitor 658 is applied to the line 630 through a 1 million ohm resistor 660 and is used to control the resistivity of the gain adjusting field effect transistor 628.

To give the automatic gain control circuitry just described a fast attack time in response to a sudden high level input signal, a pair of diodes 662 and a 10,000 ohm resistor 664 are connected into a series circuit which by-passes the resistor 656 for positive fluctuations at the output of the amplifier 654.

While the preferred embodiment of the present invention has been described, it is to be understood that numerous modifications and changes will occur to those skilled in the art. It is therefore intended by the appended claims to encompass all such modifications and changes as come within the true spirit and scope of the invention.

What is claimed as new and desired to be secured by Letters Patent of the United States is:

1. A seismic surveying system comprising:
   first means for supplying a first signal;
   at least one seismic vibrator having said first signal as an input signal and generating a vibratory output signal;
   second means for supplying a second signal that is phase-locked with said first signal and that lags said first signal in phase by increasing amounts with increasing signal frequency;
   phase detector means associated with each vibrator and having said second signal and the associated vibrator's vibratory output signal as input signals for generating a phase adjustment signal whose characteristics reflect the phase difference between the two phase detector means input signals; and
   phase adjustment means associated with each vibrator and having said phase adjustment signal as an input signal for adjusting the relative phase of the input and vibratory output signals of the associated vibrator.

2. A system in accordance with claim 1 wherein said second means comprises a phase shifting network having an input to which said first signal is applied and having an output at which said second signal appears.

3. A system in accordance with claim 2 wherein the phase shifting network has phase shift characteristics which resemble those of the seismic vibrator.

4. A system in accordance with claim 2 wherein the phase shifting network comprises one or more serially-connected stages and wherein the phase shifting characteristics of each stage are approximately in accordance with the following equation:
$$A = B + C \log D$$
where $A$ is the stage phase shift and where $B$ and $C$ are arbitrary constants.

5. A system in accordance with claim 1 wherein the phase adjustment means is disposed in the path of said first signal between said first means and the associated vibrator, and wherein the phase adjustment means comprises a variable phase-shifting network the phase shift of which is controlled by said phase adjustment signal.

6. A system in accordance with claim 1 wherein said phase detector means comprises a multiplier having two inputs into which the phase detector means input signals are fed, and having an output at which an error signal proportional to the product of the input signals appears, and means for integrating at least the fluctuating components of said error signal to form said phase adjustment signal.

7. A system in accordance with claim 6 wherein said means for integrating comprises an amplifier having both resistive and capacitive negative feedback in sufficient quantities to function as an amplifier of direct current signal components and simultaneously as an integrator of fluctuating signal components.

8. A system in accordance with claim 7 which includes adjustable means for generating a direct current signal which signal is fed into said amplifier to adjust the initial condition of the system.

9. A system in accordance with claim 1 wherein the vibratory output signal of each vibrator is generated by an integrating accelerometer amplifier having an input which is supplied with a signal from an accelerometer that is mechanically connected to the vibrator.

10. A method of synchronizing seismic vibrators comprising the steps of:
   generating a first swept sinusoid signal;
   generating a second swept sinusoid signal that is phase-locked with said first signal but that lags the first signal in phase by increasing amounts with increased frequency;
   generating a third signal that is synchronized with the vibratory output of each vibrator; and
   supplying to each of said vibrators a phase shifted version of said first swept sinusoid signal, with the amount of phase shift at any given frequency being chosen to maintain an approximately constant phase difference between said second and third signals.

* * * * *